US008615665B2

(12) United States Patent
Fitton

(10) Patent No.: US 8,615,665 B2
(45) Date of Patent: Dec. 24, 2013

(54) METHOD FOR PROVIDING HIGH ASSURANCE INTEGRITY OF INSTALLED SOFTWARE IMAGES IN A SOFTWARE DEFINED RADIO

(75) Inventor: John J. Fitton, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 1777 days.

(21) Appl. No.: 11/627,410

(22) Filed: Jan. 26, 2007

(65) Prior Publication Data

US 2008/0184038 A1    Jul. 31, 2008

(51) Int. Cl.
*G06F 21/00* (2013.01)
(52) U.S. Cl.
USPC ............ 713/187; 726/6; 726/11; 726/17; 455/552; 370/252; 709/228
(58) Field of Classification Search
USPC ......................................................... 713/187
See application file for complete search history.

(56) References Cited

U.S. PATENT DOCUMENTS

| | | | | |
|---|---|---|---|---|
| 5,828,888 A * | 10/1998 | Kozaki et al. | ................. | 717/170 |
| 5,836,013 A * | 11/1998 | Greene et al. | ..................... | 713/2 |
| 6,243,828 B1 * | 6/2001 | Chase-Salerno et al. | .... | 714/6.31 |
| 6,993,650 B2 * | 1/2006 | Landers et al. | ............... | 713/100 |
| 7,490,350 B1 * | 2/2009 | Murotake et al. | ............... | 726/11 |
| 7,783,896 B2 * | 8/2010 | Little et al. | ..................... | 713/189 |
| 2003/0200454 A1 * | 10/2003 | Foster et al. | .................. | 713/200 |
| 2004/0088559 A1 * | 5/2004 | Foster et al. | .................. | 713/193 |
| 2004/0236907 A1 * | 11/2004 | Hickman et al. | .............. | 711/114 |
| 2006/0015674 A1 * | 1/2006 | Murotake | ...................... | 711/101 |
| 2006/0129848 A1 * | 6/2006 | Paksoy et al. | ................. | 713/193 |
| 2006/0161750 A1 * | 7/2006 | Perkins et al. | ................. | 711/164 |
| 2006/0190729 A1 * | 8/2006 | Uchida | ......................... | 713/168 |
| 2013/0024922 A1 * | 1/2013 | Rodriguez | ....................... | 726/6 |

OTHER PUBLICATIONS

Securing the Download of Radio Configuration Files|http://delivery.acm.org/10.1145/1030000/1023802/p98-brawerman.pdf?ip=151.207.250.11&acc=ACTIVE%20SERVICE&key=986B26D8D17D60C8AAC6AC1B60173C4E&CFID=343369013&CFTOKEN=94531541&_acm_=1372205654_9eb6de12587fc52d2bfe6973a4a4cfe1|Brawerman et al.|2004|pp. 1-8.*

* cited by examiner

*Primary Examiner* — Mahfuzur Rahman
(74) *Attorney, Agent, or Firm* — Fox Rothschild, LLP; Robert J. Sacco

(57) ABSTRACT

Method for rapidly booting two or more computer processors (32, 28, 58-1, 58-2, 36-1, 36-2) in a device (200) designed for communicating sensitive or classified information. The method includes verifying an absence of any modification of a software image for each computer processor relative to an original authentic version of the image for the computer processor. The verifying step can include calculating an integrity check value which is uniquely determined by a combination of the original authentic version of the software image and a first random number.

20 Claims, 9 Drawing Sheets

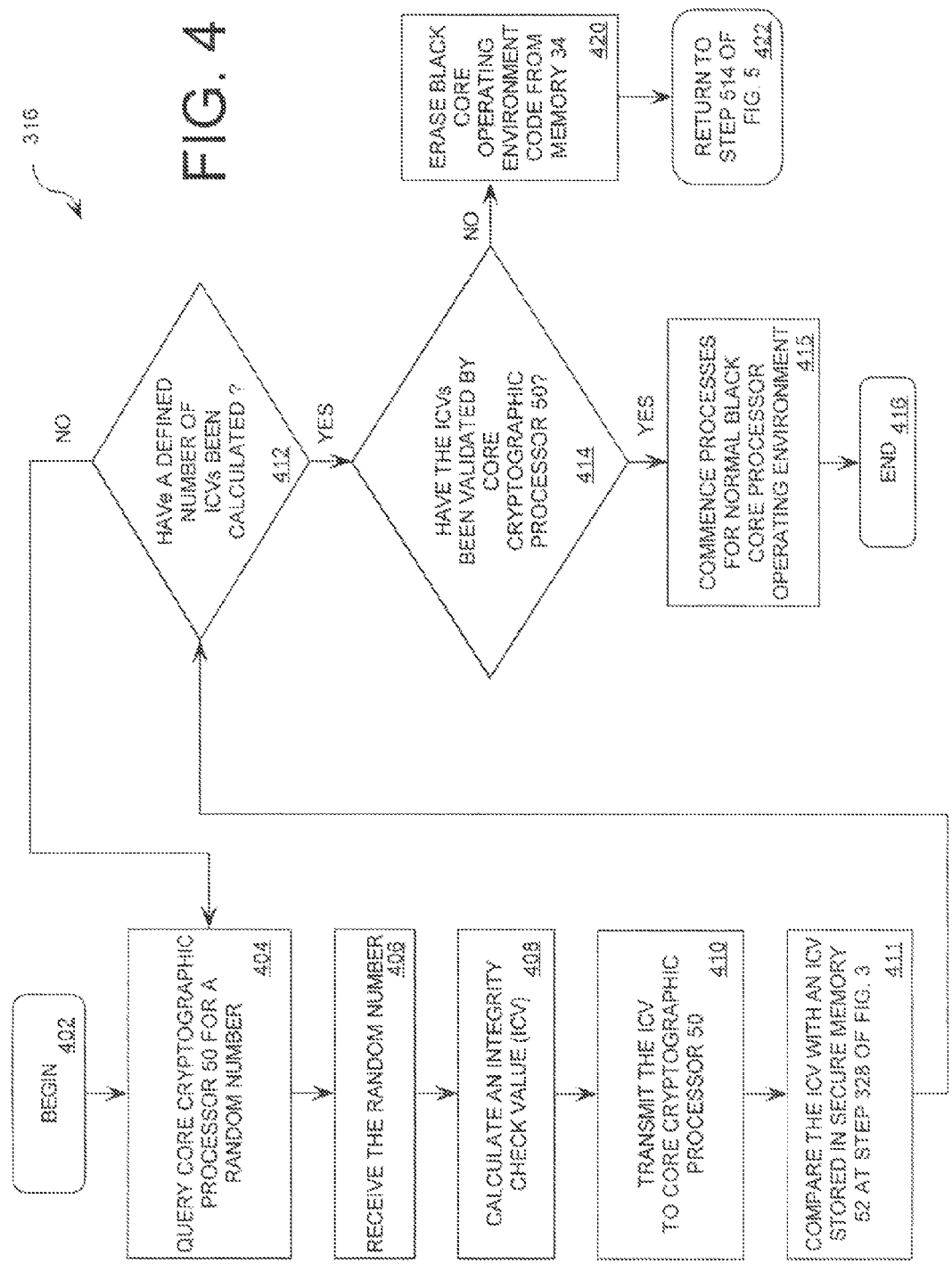

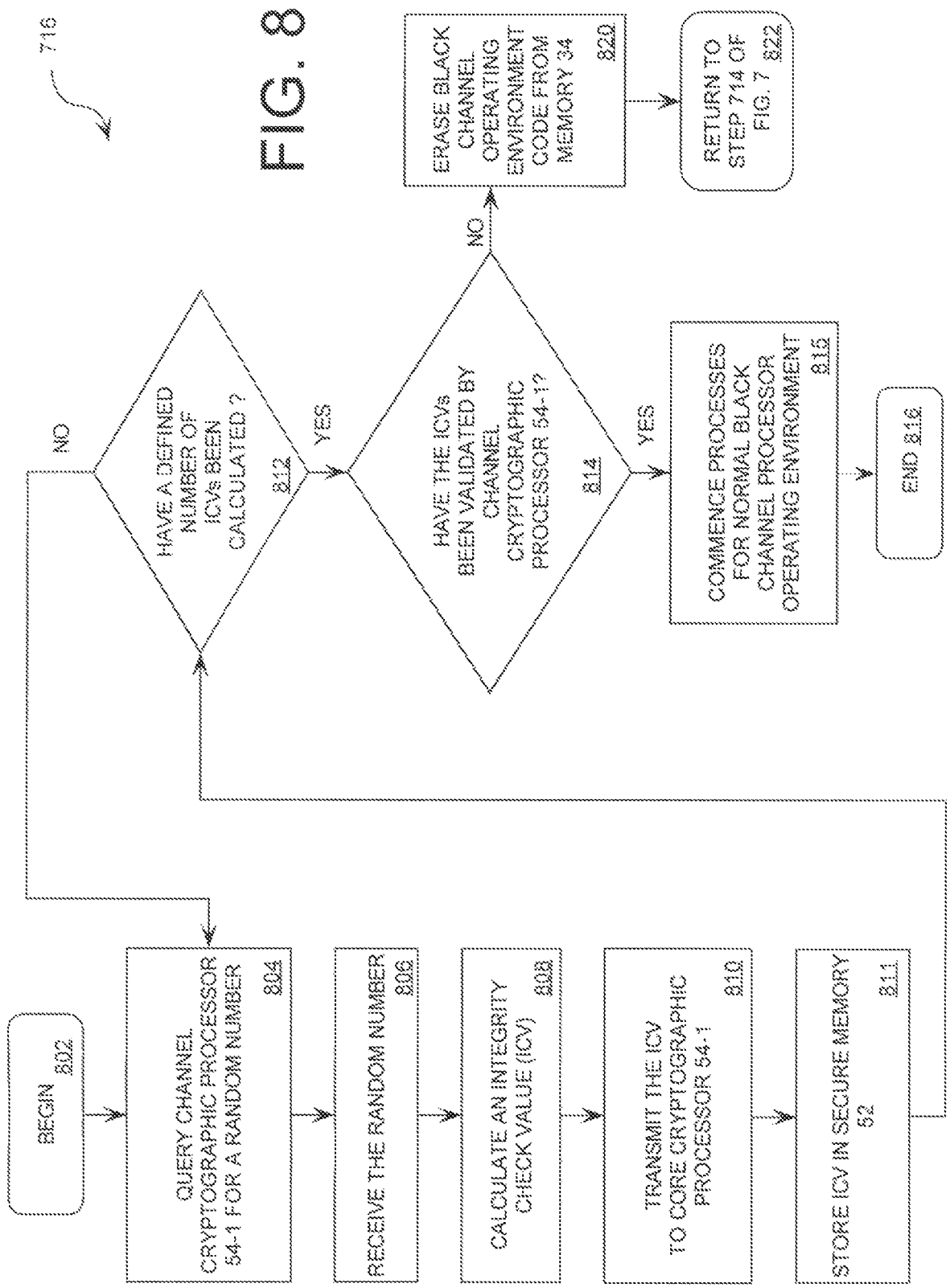

METHOD FOR PROVIDING HIGH ASSURANCE INTEGRITY OF INSTALLED SOFTWARE IMAGES IN A SOFTWARE DEFINED RADIO

BACKGROUND OF THE INVENTION

1. Statement of the Technical Field

The invention concerns wireless communications equipment. More particularly, the invention concerns a method for providing high assurance integrity of software installed in a software defined radio.

2. Description of the Related Art

A software defined radio (SDR) is a programmable and reconfigurable system that provides a flexible and scaleable architecture. Such a radio system typically supports many different communication waveforms, thus facilitating improved communications among users, such as government agencies and government services, A typical software architecture for an SDR comprises an operating environment and installed software applications, such as a waveform application and a communications application. The operating environment can include a real time operating system, a middleware component, and a framework to manage applications. An example of such an architecture is the Joint Tactical Radio Systems (JTRS) Software Communications Architecture (SCA).

Similar to traditional computer systems, the SDR's operating environments need to be booted upon user activation of the system. The SCA infrastructure, operating environments and waveform services are typically booted in a specified sequence upon user activation of the system. However, it should be understood that the operating environment programs are susceptible to alterations by physical access to a SDR system or via an attack by a software program In an attempt to subvert the SDR system. For these reasons, software programs may be stored in one or more file systems in encrypted form to protect them from being easily accessed and corrupted. However in this instance, the programs must first be decrypted before the programs can be deployed and executed from computer memory. When encryption is not used as a means of protection, the boot sequence often includes one or more steps for ascertaining whether or not a SDR system has been a victim of such a malicious act.

A typical boot sequence for a SDR includes five boot layers. For example, the device drivers are loaded first. After the device drivers are loaded, one or more operating environments are loaded. For example, a core operating environment can be loaded for a core processor. The core processor is that processor which is responsible for system resource allocation and centralized system control functions, such as initiating waveform instantaition, centralized file management, and so on. The core processor can he implemented as a single BLACK core processor, a single RED core processor, or a combination of a BLACK and RED core processor, if the core processor is a combination of a BLACK and RED core processor, then the operating environments are loaded In a particular sequence (for example, the BLACK core operating environment is loaded, followed by the RED core operating environment, the BLACK channel operating environment and the RED channel operating environment).

The terms BLACK and RED are conventionally used to refer to areas or compartments within a piece of equipment. Where such terminology is used, it is generally true that only information that is non-sensitive (from a security standpoint) is located within a BLACK compartment In contrast, a RED compartment may contain both sensitive and non-sensitive information. However, in an SDR system there is usually classified waveform code that must reside in the BLACK compartment since it is implemented by the modem. In the present application, the terms "BLACK" and "RED" are generally used to differentiate among general purpose processors (GPPs) in a channel or core of an SDR.

This step includes running at least one software routine to ascertain whether or not the operating environment programs (i.e., the operating systems, the common object brokers, and the core frameworks) have been maliciously altered. Such a software routine typically used for this purpose includes computationally intensive processing (for example, a secure hash algorithm processing such as that described in FIPS PUB 180-2, a digital signature algorithm processing, or a digital signature verification processing such as that described in FIPS PUB 186-2(1)). Once the full operating environment is loaded, the platform devices and services (i.e., common object request broker architecture (CORBA) components) are loaded. Subsequently, any other software applications, such as radio waveform, are launched.

A person can appreciate the need In a military context of being able to use a radio device almost instantaneously. For example, in a time-critical situation, such as when a group of armed forces come under attack, the need to be able to relay information between other members of the armed forces as quickly as possible is absolutely necessary. Since radios are often powered down to conserve battery power, a boot process is needed which takes a shorter amount of time to power up the SDR in such scenarios while still guarantying software integrity.

SUMMARY OF THE INVENTION

The invention concerns a method for booting two or more computer processors in a device designed for communicating highly sensitive data such as financial or classified defense information. The method begins by storing in local non-volatile memory devices respectively provided for each of the computer processors, a decrypted form of an image. The image comprises at least a portion of a computer software package required for operating each of the computer processors to process the classified information or control the operation of the device. The method further includes, prior to processing the classified information with each of the computer processors, verifying an absence of any modification of the image for each computer processor relative to an original authentic version of the image for the computer processor. For example, the verifying step can include calculating a first integrity check value which is uniquely determined by a combination of the original authentic version of the image and a first random number.

The invention also concerns a fast booting software defined radio for communicating sensitive or classified data. The software defined radio includes two or more of computer processors, each programmed with a boot software routine. At least one local non-volatile memory device is respectively provided for each of the two or more of computer processors. One or more cryptographic processors are also provided. The cryptographic processors are programmed for storing in each local non-volatile memory (in decrypted form) an image comprising at least a portion of a computer software package required for operating each computer processors. The one or more cryptographic processors are further programmed to verify an absence of any modification of the image for each of the two or more of computer processors relative to an original authentic version of each the image. For example, the cryptographic processors can he programmed to calculate a first integrity check value for each the image which is uniquely determined by a combination of the original authentic version of the image and a first random number. This calculation is advantageously performed prior to or in conjunction with storing the image in a respective one of the two or more local non-volatile memory devices. Further each of the computer processors is advantageously programmed to calculate at least one integrity check value for a corresponding one of the images stored in the local non-volatile memory. This calculation is performed each time the computer processors are booted. The cryptographic processor is programmed to compare the one or more integrity check values calculated by each the computer processor to the first integrity check value calculated by the one or more cryptographic processor.

BRIEF DESCRIPTION OF THE DRAWINGS

Embodiments will be described with reference to the following drawing figures, in which like numerals represent like items throughout the figures, and in which:

FIG. 4 is a flowchart of a portion of a boot software routine for the multi-channel software defined radio shown in FIG. 2

FIG. 8 is a flowchart of a portion of a boot software routine for the multi-channel software defined radio shown in FIG. 2

DETAILED DESCRIPTION OF THE PREFERRED EMBODIMENTS

To facilitate an understanding of the Detailed Description, definitions are provided for certain terms used therein. To "load" means to copy data from a storage medium, such as a disk, to a main memory. A program needs to be loaded before it can be executed. Loading a program further means copying the program into a place, such as a system memory, where the program can be accessed and used by another program. To "launch" means to start a program. The terms "BLACK" and "RED" as used herein refer to two (2) possible general purpose processors (GPPs) in a channel or core of an SDR.

Figure 1:
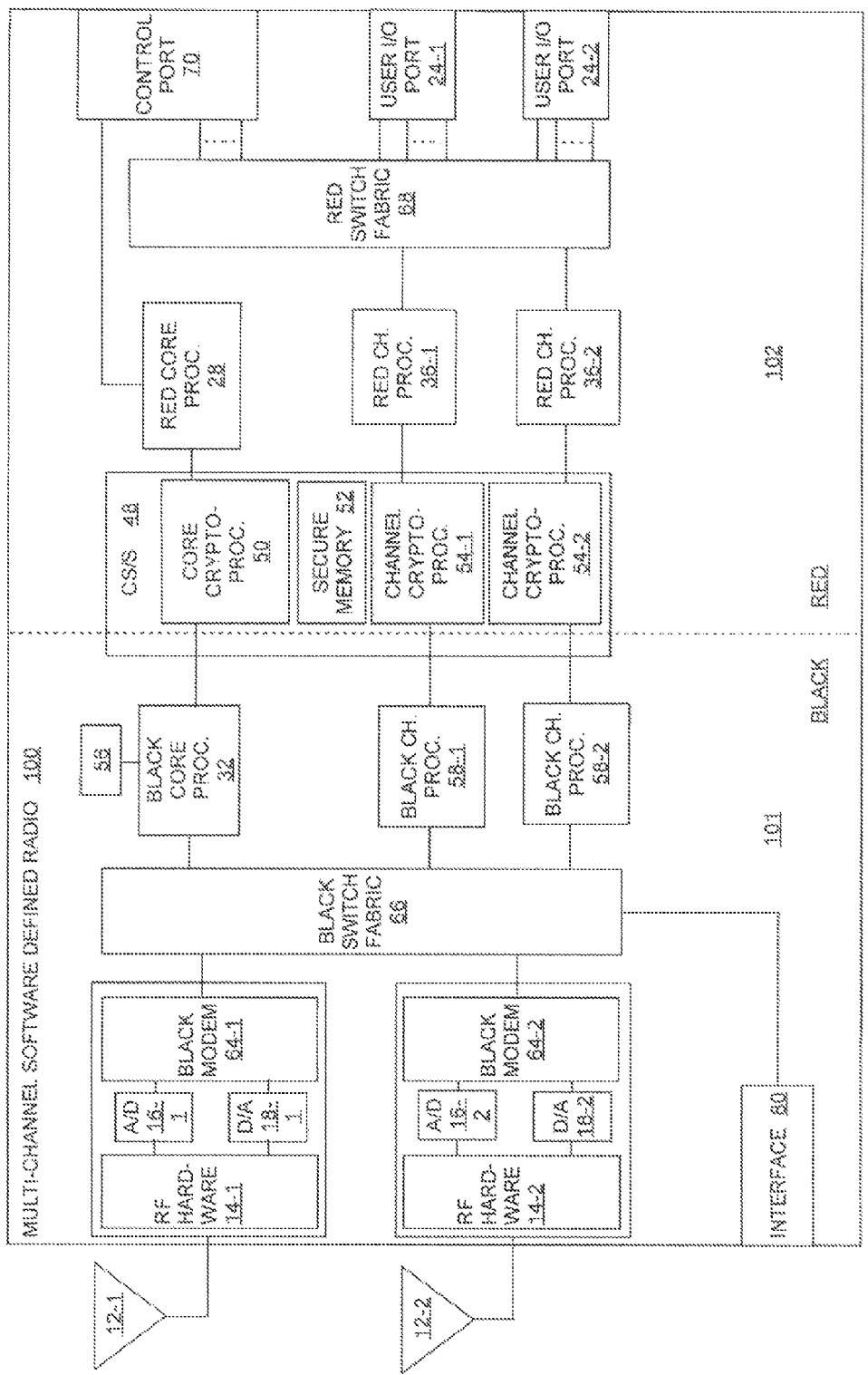
FIG. 1 is a block diagram of a multi-channel software defined radio hardware architecture.

In a conventional SDR radio used for communicating sensitive or classified data, there are several factors that cause the SDR to boot rather slowly. These factors can best be understood in relation to FIG. 1, which shows one representation of a conventional architecture for a multi-channel SDR 100 designed for communicating sensitive or classified data. FIG. 1 shows that the SDR 100 is generally divided into two portions. A BLACK portion 101 of the SDR 100 handles data that is considered unclassified or otherwise protected from disclosure or undetected alteration. For example, such unclassified data can include data which is otherwise classified, but in an encrypted form. The SDR 100 also includes a RED portion 102 which handles sensitive or classified data which is isolated from external threats by a crypto processor.

As shown in FIG. 1, the SDR 100 typically includes a BLACK core processor 32, a RED core processor 28, BLACK channel processors 58-1 58-2, RED channel processors 36-1, 36-2, BLACK modem processors 64-1, 64-2, and a channel cryptographic processor 54-1. However, it should be appreciated that some embodiments of the SDR 100 may not include separate core processors. For example, the SDR 100 can include a single core processor configured to perform the functions of both the BLACK core processor 32 and the RED core processor 28. It should also be appreciated that the functions of the BLACK core processor and the BLACK modem processors 64-1, 64-2 can be implemented in a single BLACK core/modem processor. It should further be appreciated that the SDR 100 can be implemented on a programmable device, such as a field programmable gate array (FPGA) or an adaptive self organizing concurrent system (ASOCS). In such a scenario, the BLACK core processor 32 and RED core processor 28 can be standardized core processors, likewise, it can be appreciated that the SDR 100 can be implemented in configurations in which, for example, the functions of the BLACK, channel processor 58-1, the RED channel processor 36-1, and the channel cryptographic processor 54-1 are merged into a single channel processor. Such functions may be merged when security considerations do not demand separation of these functions into separate processing devices.

Referring again to FIG. 1, the SDR 100 also typically includes antenna elements 12-1, 12-2, RF hardware 14-1, 14-2, A/D converters 16-1. 16-2, and D/A converters 18-1, 18-2. The RF hardware 14-1, 14-2 can include filters and/or amplifiers. The SDR 100 is further typically comprised of an interface 80, one or more control ports 70, and user I/O ports 24-1, 24-2. Each of the above listed components and ports of the SDR 100 are known to persons skilled in the art. Thus, these components and ports will not be described in great detail herein. However, it should be understood that the interface 80 can be comprised of Ethernet ports and/or an interface configured to allow an SDR to network with another SDR or system.

BLACK switch fabric 66 is provided for selectively routing digital data between BLACK modem processors 64-1, 64-2, the BLACK core processor 32, and the BLACK channel processors 58-1, 58-2. The degree to which any such BLACK switch fabric 66 is used is specific to a given implementation. As a result, the BLACK switch fabric 66 is optional. The function of selectively routing digital data between processors may be entirely eliminated from the SDR 100. Similarly, an optional RED switch fabric 68 may be provided for selectively routing digital data between the RED channel processors and the user I/O ports 24-1, 24-2. Switch fabrics of the kind described herein are well known in the art and therefore will not be described in detail.

As shown in FIG. 1, the cryptography subsystem 48 is comprised of a core crypto-processor (core cryptographic processor) 50, a secure memory 52, and channel crypto-processors 54-1, 54-2. The secure memory 52 provides a storage device for random numbers and integrity check values. It should be appreciated that the random numbers and the integrity check values can be stored in the secure memory 52 in accordance with any given populating scheme. For example, the random numbers and the integrity check values can be stored in a table format such that each number or value is associated with a particular operating environment and/or software application. Cryptographic subsystems as described herein are known in the art and therefore will not be described in detail.

One factor contributing to the slow boot of SDR 100 arises from the various requirements for handling computer software used on computer processors contained in the SDR. As used herein "software" refers to operating system software as well as application software. Existing security requirements are such that software used in the SDR 100 must be stored in encrypted form in a non-volatile memory, such as file system storage device 58. The non-volatile memory is a repository for all software in the SDR 100. The software includes applications that may not be instantiated for a current time use but may be needed in a future time use. As such, the non-volatile memory contains the one (1) known valid version of all software employed by the SDR 100 should any of the software need to re-loaded. Notably, this is true regardless of whether the software is itself deemed to be classified in nature. One reason is to help prevent malicious or invasive alteration of the software which could be used to exploit the security of the SDR. Another reason is to help prevent disclosure of the software for analysis by a third party.

For security reasons, only one processor is typically able to access the file system storage device 56 containing the encrypted computer program code. For example, an SDR core processor responsible for unclassified data processing is typically responsible for accessing the file system storage device. In FIG. 1 this processor is the BLACK core processor 32. Notably, however, the BLACK core processor 32 does not have the required security features for handling decryption and validation of the encrypted computer software. Accordingly, in order to begin the boot process, the BLACK core processor 32 must use low level code to access its encrypted software contained in file system storage device 56. Thereafter, the BLACK core processor must communicate the encrypted software to a cryptographic subsystem 48 containing a core crypto-processor (core cryptographic processor) 50. The cryptographic processor 50 will de-crypt and validate the encrypted software, before passing it back to the BLACK core processor 32 in decrypted form. The BLACK core processor 32 will then load the software into a memory to complete its boot process.

Notably, the memory for the BLACK core processor in which the decrypted software is stored is conventionally a volatile memory. The volatile memory is used for a security related reason. In particular, the software contained in such volatile memory will be automatically erased from such volatile memory when the power to the radio is turned off. In this regard, it should be noted that the software stored in the volatile memory is in a decrypted form and therefore secured only by physical means associated with the SDR equipment, in a military SDR, the SDR equipment includes TAMPER detection capabilities designed to detect an attempted physical access to the radios infernal hardware and/or software. Activation sensors may be used for this purpose. The activation sensors can be configured for disrupting power or activating alarms to indicate that a physical access has been attempted. The activation sensors can also be configured for disrupting power to prevent access to the software.

Another important factor that contributes significantly to a rather slow SDR boot process is the multiple processors contained in the SDR 100 that must be booted and the way in which they must be booted. For example, an SDR 100 designed for handling classified data communications can have at least one core processor 32, 28 for controlling the operation of the un-classified data channels and the operation of the classified data channels. The SDR 100 can also include a cryptographic processor 50. The SDR can further include at least one BLACK channel processor 58-1 for processing unclassified waveforms and at least one RED channel processor 36-1 for processing classified waveforms. A channel cryptographic processor 54-1 is commonly used to communicate data between the RED channel processor 36-1 and the BLACK channel processor 58-1. Thus, in a single channel SDR designed for military communications, there could be at least four separate processors, not including the cryptographic processors and/or modem processors. Each of these processors must he included in the boot process for the system.

Moreover, a multi-channel SDR 100 would, for each additional channel, include an additional BLACK channel processor 58-2, RED channel processor 36-2, and channel cryptographic processor 54-2. Thus, a two channel SDR 100 as shown would have up to six processors (not including the cryptographic processors), all of which must be included in the boot process. Not surprisingly, multi-channel SDRs using conventional boot processing methods can require between two (2) to fifteen (15) minutes to complete a boot process for the entire SDR. This is a long time period compared to a traditional radio system's boot, processing which typically takes five (5) to thirty (30) seconds.

One of the reasons for the lengthy boot process in SDR radio 100 is that the process itself is highly serial in nature. As noted above, the BLACK core processor 32 initially operates at a very basic level to access certain encrypted software for its own boot process, and communicates such encrypted software to the core cryptographic processor 50. The BLACK core processor 32 is the only processor that can perform this function because it has exclusive access to the file system storage device 56 in which the encrypted software programs are stored. The core cryptographic processor 50 decrypts and validates the software, after which the decrypted software is communicated to the BLACK core processor 32 so that it can complete its boot process.

A similar process is repeated for each of the remaining processors. However, the encrypted code for each of the remaining processors must first be obtained from a central file system managed by the BLACK core processor 32. For example, after its own boot process is completed, the BLACK core processor 32 accesses the encrypted software for the RED core processor 28. This encrypted software is communicated to the core cryptographic processor 50 for validation and decryption. Thereafter, the core cryptographic processor 50 provides the decrypted software to the RED core processor 28. The RED core processors software is stored in a volatile memory associated with RED core processor 28. Accordingly, the boot process for the RED core processor 28 is delayed from completing its boot process while it watts for BLACK core processor 32 and core cryptographic processor 50 to perform the above-described operations.

After the RED core processor has been provided with its software the BLACK core processor can continue with the boot process for other processors in the SDR 100. Encrypted software for BLACK channel processor 58-1 is accessed by the BLACK core processor 32 and communicated to the BLACK channel processor 58-1 through the BLACK switch fabric 66. Thereafter, the BLACK channel processor 58-1 passes the encrypted code to the channel cryptographic processor 54-1 for decryption and validation. When these tasks are complete, the decrypted software is communicated to the BLACK channel processor 58-1 for storage in a volatile memory. Notably, BLACK channel processor 58-1 is delayed from completing its boot process while it waits for the BLACK core processor 32, the core cryptographic processor 50, and the channel cryptographic processor 54-1 to perform all of the preceding operations associated with the boot process.

Each channel processor can have a different portion of the software package. Accordingly, the foregoing process must be repeated for decrypting, validating, and communicating the software for the BLACK channel processor 58-2. Notably, the BLACK channel processor 58-2 is delayed from completing its boot process while it. waits for BLACK core processor 32, the core cryptographic processor 50, and the channel cryptographic processor 54-2 to perform all of the preceding operations associated with the boot process.

Encrypted software for each of the RED channel processors 36-1, 36-2 is also decrypted by the respective channel cryptographic processor 54-1, 54-2 for that channel Encrypted software for each RED channel processor 36-1, 36-2 is communicated by the BLACK core processor 32 to a respective BLACK channel processor 58-1, 58-2 as described above. The respective BLACK channel processor 58-1, 58-2 then communicates the encrypted software to the respective channel cryptographic processor 54-1, 54-2. The channel cryptographic processors 54-1, 54-2 respectively perform decryption and validation of the software before passing the software on to each RED channel processor 36-1, 36-2. Finally, the software is stored in a respective volatile memory for each RED channel processor. Notably, each RED channel processor 36-1, 36-2 can have a different portion of the software package. Accordingly, the process of decrypting, validating, and communicating the software for the RED channel processor 36-2 is performed separately for the RED channel processor 36-1.

The above described boot only applies to an operating environment for the channel processors 36-1, 36-2, 58-1, 58-2. After the operation environment has been deployed, a waveform application can be instantiated. Depending upon the nature of the SDR 100, the waveform application could be instantiated immediately after the operating environment has been deployed. Alternatively, if a waveform application has not been assigned to BLACK, and RED channel processors, then the SDR 100 will wait until it is commanded to deploy the waveform application. Upon being deployed, the code for the waveform application is communicated from a central file system to the BLACK channel processors 58-1, 58-2 via the BLACK core processor 32. The code is decrypted and validated by a respective channel crypto-processor 54-1, 54-2, Similarly, the code for the waveform application is communicated from a central file system to the RED channel processors 36-1, 36-2 via the BLACK core processor 32. The code is decrypted and validated by a respective channel crypto-processor 54-1, 54-2. The order in which the code is communicated to the channel processors 58-1, 58-2, 36-1, 36-2 is not relevant since each channel processor is typically configured to instantiate a respective code associated with the waveform application. In fact, if the channel crypto-processors 54-1, 54-2 are configured to decrypt code, then the instantaition of the code for the channel processors 58-1, 58-2, 36-1, 36-2 can occur in parallel.

From the foregoing, it will be appreciated that in a conventional SDR 100, the various SDR processors must wait to receive their software for completing the boot process. The serial nature of the boot process significantly contributes to the long period of time required to perform a boot process. Ideally, all of the processors in the SDR would boot concurrently (in parallel) in order to save time. In practice however, this has been difficult to achieve due to the security precautions associated with classified data and programming.

Method and System Overview

Figure 2:
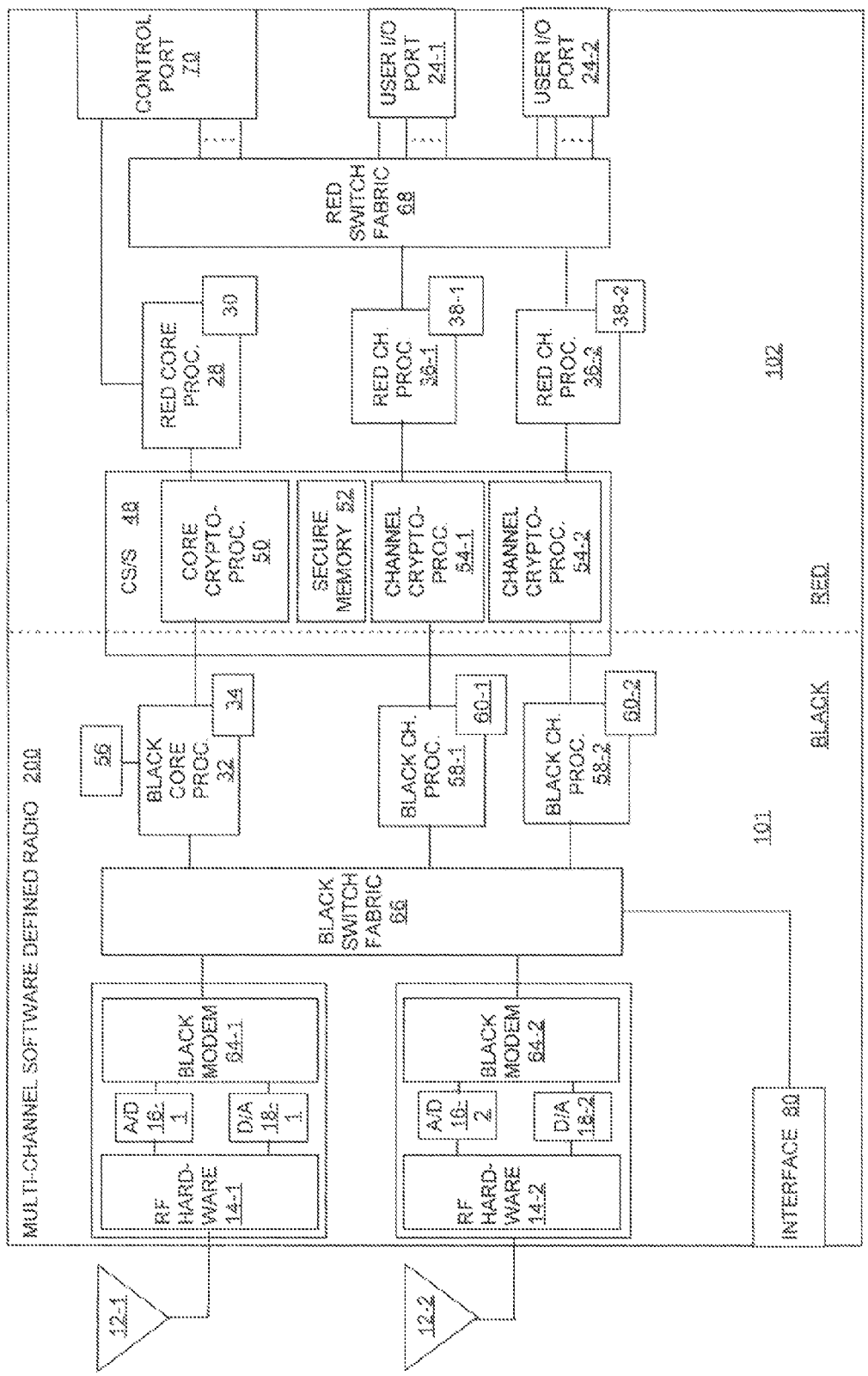
FIG. 2 is a block diagram of a multi-channel software defined radio that is useful for understanding the invention.

FIG. 2 is a block diagram of a modified version of the multi-channel software defined radio (SDR) 200 hardware, architecture. In FIG. 2, like numerals represent the same structure as in FIG. 1 unless otherwise stated. Those skilled in the art will appreciate that the SDR 200 architecture illustrated in FIG. 2 is one possible example of a SDR architecture in which the boot process described herein can be implemented. However, the invention is not limited in this regard and any other suitable SDR architecture can also be used without limitation. Accordingly, the boot process described herein can be implemented in any SDR system comprised of two or more processors.

The SDR 200 can support a software communications architecture (SCA). For example, the SDR 200 can support an operating environment, an object request broker, and a SCA core framework. Those skilled in the art will readily appreciate that the operating environment for each processor 32, 28, 58-1, 58-2, 36-1, and 36-2 can include without limitation device driver software programs, an operating system, radio services software programs, and other software applications. It should also be understood that each processor 32, 28, 58-1, 58-2, 36-1, and 36-2 can require its own unique combination of these software programs. For convenience, the group of various software programs required by each processor shall be collectively referred to herein as a "portion of the software package." Thus the term "portion of the software package" as used herein includes, without limitation, device driver software programs, an operating system, radio services software programs, and any other software required for a particular processor 32, 28, 58-1, 58-2, 36-1, and 36-2 to perform its intended function in the SDR 200.

The present invention includes a method for detecting if software code deployed to one or more processors has been corrupted. The method does not speed up the initial deployment (installation) of the code. However, in subsequent boot operations, processors will have immediate access to the deployed/installed code. The steps of retrieving, decrypting and validating are replaced by a simple verification process. Unlike the architecture used in conventional SDR 100, a local non-volatile memory is provided for each processor 32, 28, 58-1, 58-2, 36-1, and 36-2. The local non-volatile memory for each of these processors is respectively identified in FIG. 2 by reference numbers 34, 30, 60-1, 60-2, 38-1, and 38-2. For example, a non volatile flash memory or a battery backed static RAM can be used to implement each of the local non-volatile memories.

According to an embodiment of the invention, at least a portion of the portion of the software package for each processor can be retained in its local non-volatile memory when the SDR 200 is powered down, and need not be reinstalled unless tampering with such software has been detected. If all or some of the software packages need to be reinstalled, then the reinstallation process is substantially the same as the installation process described above (in relation to FIG. 1). However, in order to efficiently and rapidly boot the SDR 200, the reinstallation process must be completely performed prior to any subsequent boot processes. At a minimum, the portion of the portion of the software package retained in the local non-volatile memory will comprise an operating environment (OE) needed by each processor and can advantageously include other parts of the portion of the software package for that processor as well. For example, the portion of the portion of the software package retained in the local non-volatile memory of each processor could also include waveform code and other application software.

A portion of the portion of the software package that is not classified is stored in the local non-volatile memory associated with each processor without encryption. Sensitive or classified files and data will be stored in encrypted form in the local non-volatile memory associated with each processor. These encrypted files and data are decrypted as part of the boot process for SDR 200 and will exist in decrypted form only in a local volatile memory associated with a respective processor. Accordingly, such sensitive or classified files will be cleared or erased during any power down of the SDR 200, or when the channel is being reconfigured for use with a different waveform.

Significantly, the local non-volatile memory associated with each processor will not replace the encrypted files stored in the file system storage device 56. The complete portion of the software packages for each of the processors will remain in the non-volatile file system storage device 56, stored in an encrypted format. However, rather than redeploying the portion of the software packages contained in such file system storage device 56 with each boot of the SDR 200, these files in the file system storage device 56 would only be used when a problem exists with the portion of the portion of the software package stored in the local non-volatile memory associated with a respective processor.

In order to assure the integrity of software actually installed on each processor, 32, 58-1, 58-2, 28, 36-1, 36-2 a process must be provided to validate the portion of the portion of the software package stored in the local non-volatile memory for each processor. This process must include a high assurance integrity mechanism to confirm that the software in the local non-volatile memory has not been compromised or maliciously altered in any way. The present invention provides such a high assurance integrity mechanism. The approach requires that write access to the local non-volatile memory is exclusively limited by the cryptographic processor associated with each channel processor or core processor. For example, the core cryptographic processor 50 can control write access to the BLACK core processor 32 and the RED core processor 28. The channel cryptographic processors 54-1, 54-2 can control write access to the BLACK channel processors 58-1, 58-2 and the RED channel processors 36-1, 36-2, respectively. Such control overwrite access to the local non-volatile memories is necessary to prevent unauthorized information (code or data) from being written to the local non-volatile memories for each processor. According to a preferred embodiment, the cryptographic processors also advantageously have the ability to erase the local non-volatile memory when circumstances require such action. For example, such a situation can arise when an integrity check of the software contained In the local non-volatile memory falls. If should be appreciated that processing performed by current non-volatile memories is typically not fast enough to allow code to execute from the non-volatile memories. As such, the code must be transferred to a volatile memory prior to being executed. However, if non-volatile memories having an improved processing time feature are invented and employed, then only classified code and data will need to be stored in volatile memory prior to being executed.

The process for integrity checking of the portion of the portion of the software package that is stored in each processors local non-volatile memory advantageously begins in a factory setting a part of a trusted process. During the initial loading of software into each of the local non-volatile memories, the CS/S 48 will calculate an integrity check value for each file that is placed into the local non-volatile memory of a particular processor. The precise nature of the means for calculating the integrity check value is not critical to the Invention. However, it is advantageously selected so that it has sufficient strength. For example, the means for calculating the integrity check value can include a simple 32 bit cyclic redundancy code (CRC) or can be as complicated as a secure hash algorithm (SHA).

It should also be understood that in the present invention, each processor 32, 28, 58-1, 58-2, 38-1, 38-2 is presumed to include a non-volatile ROM which contains a boot code. The boot code is a small "trusted" application that can only be changed in a factory environment. The factory environment requirement is ensured by implementing security steps. For example, a special fixture is required for programming devices (e.g. PROMs or EPROMs) used to store boot code. Also, an SDR 200 is required to have TAMPER detection capabilities such that installed devices (e.g. PROMs or EPROMs) are protected from undetected malicious alterations. More particularly, the boot code is a defined application for preparing a processor so that It is fully operational (i.e. up and running). The boot code typically includes instructions for launching one or more operating systems and/or software applications. Boot codes are well known in the art and therefore will not be described here in detail.

Up to four different versions of this boot code will generally be required since there is a somewhat different boot process for (1) the BLACK core processor 32, (2) the RED core processor 28, (3) the BLACK channel processors 58-1, 58-2, and (4) the RED channel processors 36-1, 36-2, in the following sections, the processes associated with each of these four different versions of the boot code will be separately described in detail.

BLACK Core Processor Boot Process

The boot code for the BLACK core processor 32 must be capable of booting the BLACK core processor in three distinct situations. In a first situation, no code has been loaded info the SDR and there is no established file system. In this case, the boot codes is waiting for the CS/S 48 to output encrypted code which the BLACK core will use to establish a file system. After the file system is established, the core processor automatically reboots and starts the second situation. In any case, the boot code must be able to respond properly to a situation where a file system has not been established in the file system storage device 56.

In a second situation, the boot code must be able to respond property to a factory initialization of the SDR 200, where there are no files presently stored in the non-volatile file system storage device 56. In the second situation, a file system is established, but a code image doesn't exist in a non-volatile memory local to each processor. In this situation, the core processor must load the code image into its local non-volatile memory for retention and subsequent operational boot requirements.

In a third situation, the file system exists and the node image exists in the local non-volatile memory of each processor. In this third situation, the appropriate portion of the software packages or portions thereof are already stored in the file system storage device 56 and in the local non-volatile memories 34, 30, 60-1, 60-2, 38-1, and 38-2. In this situation, the boot process will proceed to a complete operational state of the SDR after computing an integrity check value as described herein.

Figure 3A:
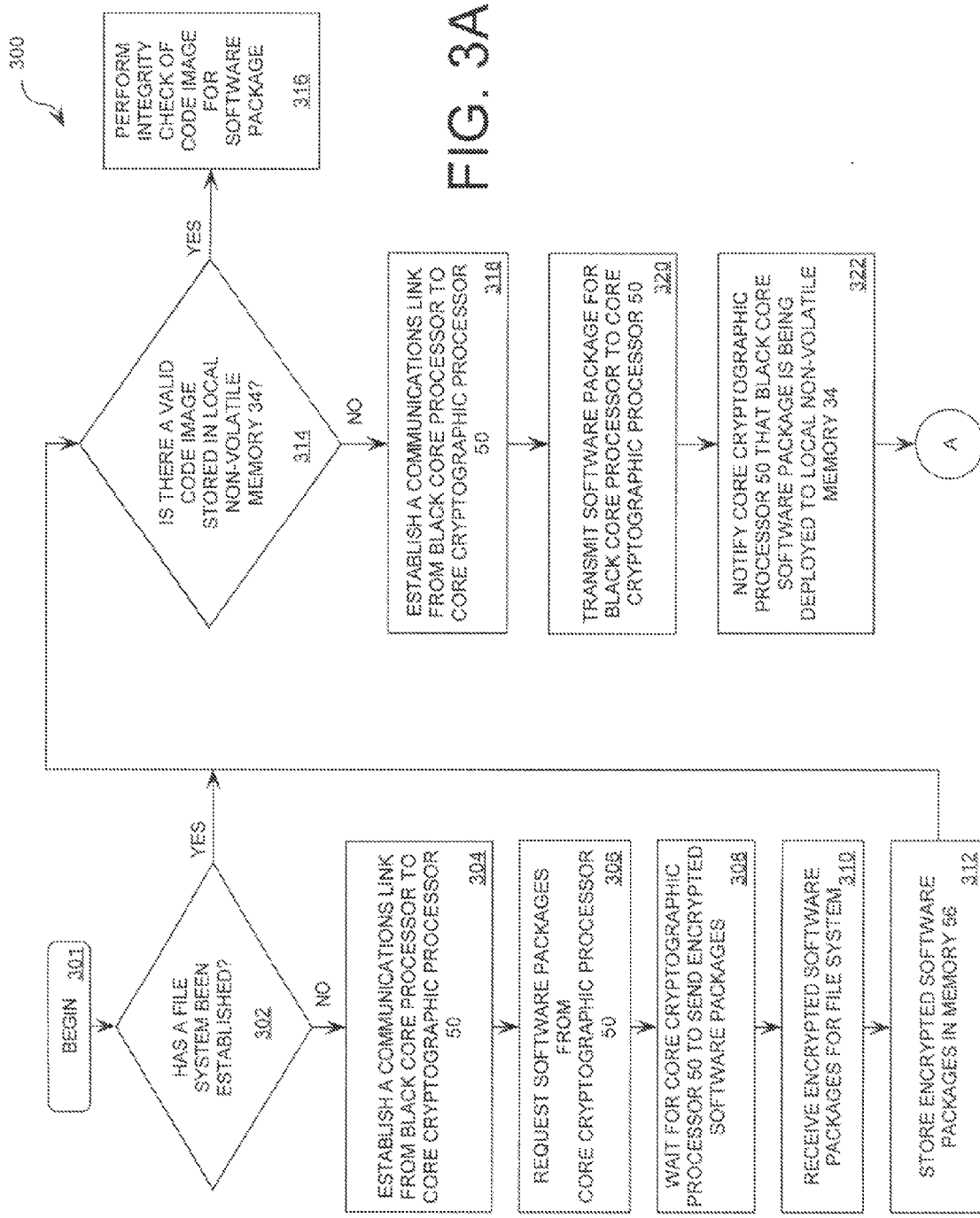
FIG. 3 is a flowchart of a portion of a boot software routine for the multi-channel software defined radio shown in FIG. 2.
Figure 3B:
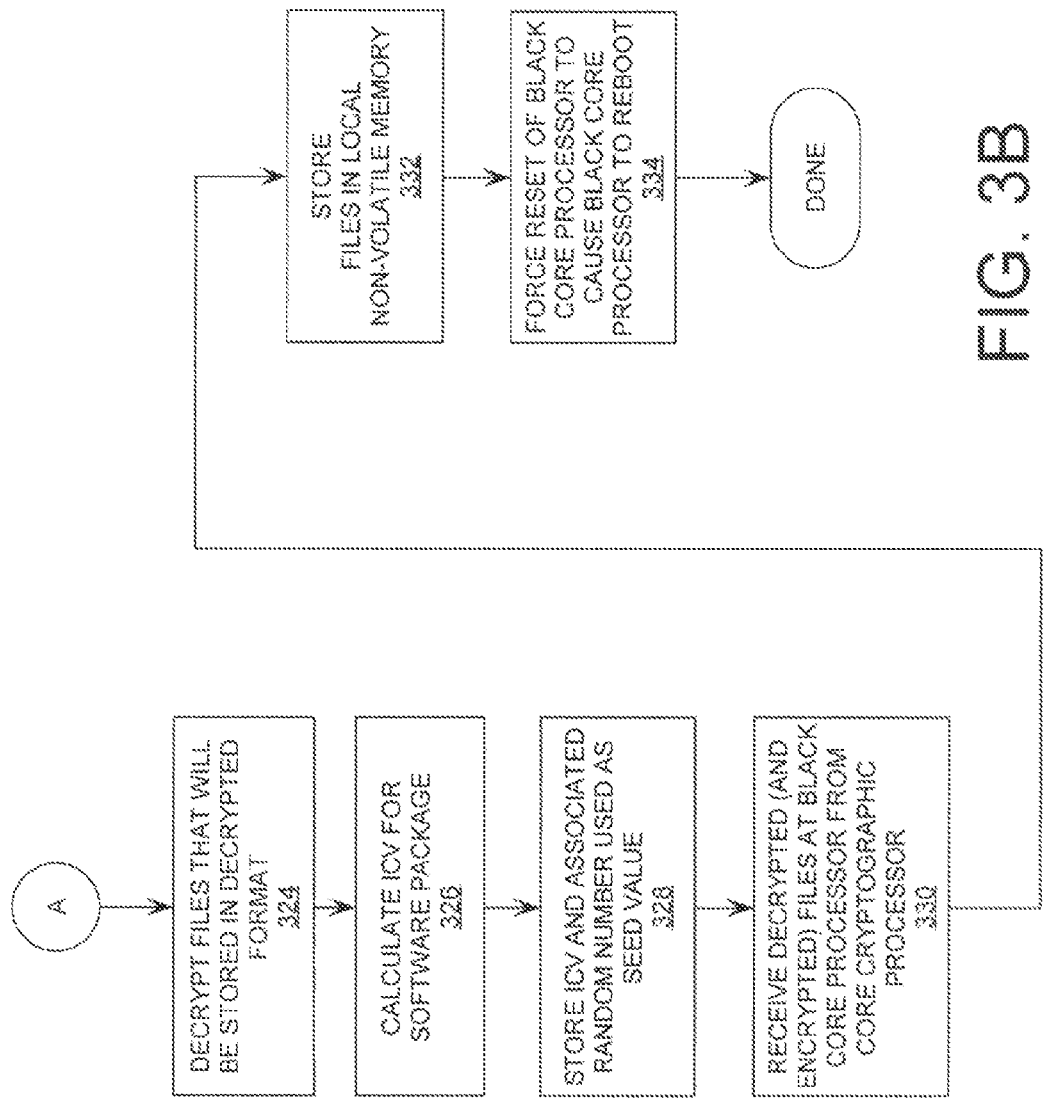

Referring now to FIG. 3, a flowchart of a software routine implemented by the boot code for the BLACK core processor 32 is shown. The software routine 300 begins at step 301 and continues with a decision step 302. In decision step 302, the BLACK core processor 32 will determine whether a file system has been established in the file system storage device 56. The file system should contain the encrypted portion of the software packages for all of the processors 32, 28, 58-1, 58-2, 36-1, 36-2. However, in a situation where the SDR 200 is being initialized for the first time (e.g., at the factory), there will be no such portion of the software packages in file system storage device 56 (302:NO). Accordingly, control will pass to step 304 where a communications link is established between the BLACK core processor 32 and the core cryptographic processor 50. In step 306, the BLACK core processor 32 transmits a message to the core cryptographic processor 50 including a request for one or more of the encrypted portion of the software packages needed to establish a file system in file system storage device 56.

In step 308, the BLACK core processor 32 waits for the core cryptographic processor 50 to send the encrypted portion of the software packages for the file system. In step 610, the BLACK core processor 32 receives the encrypted portion of the software packages from the core cryptographic processor 50. It should be understood that this step presumes that portion of the software packages are loaded or are otherwise available to a CS/S 48. Upon receipt of the encrypted portion of the software packages, the files are stored in file system storage device 56. Subsequently, the software routine 300 continues with a decision block 314.

Once a file system containing the portion of the software packages has been established in file system storage device 56 (302:YES), then control passes to a decision step 314. At this point the BLACK core processor determines if there is a valid code image of at least a portion of the portion of the software package for the BLACK core processor stored in a focal non-volatile memory 34. Generally, the portion of the portion of the software package that should be stored in local non-volatile memory 34 will at least include an operating environment for the BLACK core processor. At least during the factory initialization of the SDR 200, no such valid code image will exist in the local non-volatile memory 34 (314: NO). Consequently, control passes to step 318. In step 318, a communications link is established between the BLACK core processor 32 and a core cryptographic processor 50. The BLACK core processor 32 then sends all files in the required portion of the portion of the software package to the core cryptographic processor 50. As noted above, the required portion of the portion of the software package will generally include at least the BLACK core operating environment.

In step 322, the BLACK core processor 32 will notify the core cryptographic processor 50 that the operating system for the BLACK core processor 32 is being deployed. This notification is necessary because the core cryptographic processor 50 will have to enable writing and storing the necessary encrypted and decrypted portions of the portion of the software package into the local non-volatile memory 34. Such notification is also necessary because, the core cryptographic processor 50 will need to calculate an integrity check value (ICV). Specifically, the ICV must be calculated for the image of that portion of the software package to be stored in local non-volatile memory 34.

The portion of the portion of the software package which will be stored in local non-volatile memory 34 will generally include classified and non-classified files. Non-classified software and data which are not of a sensitive nature are preferably stored without encryption in the local non-volatile memory 34. In contrast, classified or sensitive software or data are stored in local non-volatile memory 34 in an encrypted format. Accordingly, in step 324, the core cryptographic processor 50 will decrypt files as necessary for the BLACK core operating environment.

It should be appreciated that the tiles to be installed and stored as encrypted or decrypted files may include a file label to identify them as such. File labels are well known to persons skilled in the art. Thus, file labels will not be described in detail herein. However, it should be appreciated that any type of file label known to persons skilled in the art may be used without limitation.

In step 326 an integrity check value (ICV) is computed by the core cryptographic processor 50 for the portion of the portion of the software package to be stored in local non-volatile memory 34. The precise method of calculating the integrity check value in the present invention is not critical. However it must have sufficient mathematical strength to ensure the integrity of the code should single or multiple bits be altered. The method for calculating the integrity check value can be as simple as a 32 bit cyclic redundancy code (CRC) or as complicated as a SHA-256 has code. These and other integrity checking methods are well Known in the art. Accordingly, they will not be described here in detail.

The core cryptographic processor 50 will begin the process of calculating an ICV by generating a first random number of appropriate length. This first random number will be used by the core cryptographic processor 50 as a seed for calculating the first ICV. In step 328, the core cryptographic processor 50 will save the first random number and the ICV together in secure memory 52. These values will he used during subsequent boot processes.

In step 330, the core cryptographic processor 50 will transmit the files comprising the portion of the portion of the software package to be stored in local non-volatile memory 34. In step 332, the BLACK core processor receives the files (decrypted except when they must be stored encrypted) and will store these files in the local non-volatile memory 34. Thereafter, in step 334, a reset command is communicated to the BLACK core processor 32 so as to cause it to reboot. This reset command can be provided by the core cryptographic processor 50, or can be provided by the BLACK core processor 32 itself. Because of the reboot, the BLACK core processor will repeat the startup checks described in steps 302 through 314 and will find that the file system in local non-volatile memory 34 has been established (302:YES) and that there is a valid image of a portion of the portion of the software package image stored in the local non-volatile memory 34 (314:YES). In this regard, it should be appreciated that the BLACK core processor 32 can determine whether there is a valid code image in the local non-volatile memory 34 simply by querying the CS/S 48 for certain information. This information can indicate whether the code image has been loaded into the local non-volatile memory 34. Accordingly, the BLACK core processor 32 will proceed with a standard boot process. More particularly, the following step 314, the process will continue on to process 316 in which an integrity check is performed for the portion of the portion of the software package that is contained in the local non-volatile memory 34. Process 316 is described in more detail in relation to FIG. 4.

Referring now to FIG. 4, process 316 begins with step 402 and continues to step 404. In step 404, the BLACK core processor 32 sends a message to the core cryptographic processor 50 requesting a random number. In step 406, the BLACK core processor 32 receives a random number from the core cryptographic processor 50. However, the random number received can be, but is not necessarily, equal to the value of the first random number value as used by the core cryptographic processor in step 326. Upon receipt of the random number, the BLACK core processor 32 performs processing in step 408 to calculate an ICV for the code package stored in the local non-volatile memory 34. It should be understood that the BLACK core processor 32 will utilize an algorithm to calculate an ICV and this will be the same algorithm which is used by the core cryptographic processor 50 in step 326. Accordingly, if the random number provided by the core cryptographic processor is in fact equal to the first random number, then the BLACK core processor 32 should obtain an identical first ICV as previously obtained by the core cryptographic processor 50 in step 326.

In step 410, the BLACK core processor 32 transmits the ICV value it has calculated to the core cryptographic processor 50. The core cryptographic processor 50 compares this value with the value it had previously stored in secure memory 52 at step 328 of FIG. 3. After step 411, control passes to a decision step 412. If a defined number of ICVs (for example, three (3) ICVs) have not been calculated (412:NO), the process returns to step 404 and the process in steps 404 though 411 is repeated. Each time the process is repeated, the core cryptographic processor 50 provides the BLACK core processor 32 with a different random number. Significantly, in one instance when the core cryptographic processor 50 provides a random number to the BLACK core processor 32, the value of the random number will be equal to the first random number originally used by the core cryptographic processor 50 in step 326. Accordingly, only one ICV calculated by the BLACK core processor 32 will equal the ICV calculated in step 326. This dual ICV check significantly enhances the integrity assurance process.

After a sufficient number of ICV values have been calculated (412:YES) the process will transition to step 414. In step 414 the first ICV value stored in secure memory 52 will be compared to the ICVs calculated by the BLACK core processor 32. If the first ICV equals the ICV calculated by the BLACK core processor 32 using the first random number, then this fact is used by the core cryptographic processor 50 as an indication that the portion of the portion of the software package contained in the local non-volatile memory 34 has not been altered. In the first boot cycle, only one ICV value will be verified.

The first random number value and the ICV calculated from the first random number value are always retained in secure memory 52. In addition, one of the other ICV values calculated in step 408, and the associated random number or seed value is also maintained in the secure memory 52. The remaining ICV values and random numbers can he discarded. Consequently, the core cryptographic processor 50 will always store two sets of ICV/random number values for a portion of a portion of the software package stored in the local non-volatile memory. The first set will include the first ICV and first random number. The second set will include a second ICV based on a second random number from the previous boot cycle. In subsequent boot processes, the core cryptographic processor 50 will provide the first random number and the second random number to the BLACK core processor 32 in subsequent iterations of step 406. In step 414, the core, cryptographic processor 50 will verify that both the first and second random number values will cause the BLACK core processor 32 to generate the correct corresponding ICV. Each time the BLACK core processor 32 is rebooted, the second random number and second ICV will be replaced with new values. However, the first random number and first ICV is always used as a check value.

If the ICV calculated in step 408 is determined to be incorrect in step 414 (414:NO), then control passes to step 420. In step 420, the BLACK core operating environment code is erased from the local non-volatile memory 34. Subsequently, step 422 is performed where software routine 400 returns to step 314 of FIG. 3 such that another boot cycle of the BLACK core operating environment is performed.

If the integrity check value has been validated by the core cryptographic processor 50 (414:YES), then the process continues on to step 415 in which normal BLACK core operating environment processing is commenced. This will generally involve setting up all of the required bypasses and cryptographic configurations needed to support normal operations of BLACK core processor 32. It will also include any operations necessary for beginning the process of loading code into the RED core processor 28. Finally, the BLACK core processor will begin processing requests from various channel processors including BLACK channel processor 58-1, 58-2 and RED channel processors 36-1, 36-2. Thereafter, the boot process continues on to step 416 where the software routine 316 terminates.

Notably, in the case of an original factory initialization of the SDR 200, no portion of the software packages or portion thereof will at this point have been provided for the RED core processor 28, BLACK channel processors 58-1, 58-2, and RED channel processors 36-1, 36-2. Accordingly, additional steps are required to load images of the respective portions of the portion of the software packages into the respective local non-volatile memories 30, 60-1, 60-2, 38-1, 38-2 for these processors. In general, these images will be comprised of at least an operating environment for each respective processor.

Further, if should be noted that while BLACK core processor 32 has been performing the various processes as described above in relation to FIGS. 3 and 4, the RED core processor has been waiting. In particular, RED core processor 28 is waiting for its decrypted image of its portion of the software package (or portion thereof) to begin flowing from the file system storage device 56, through the cryptographic processor, and into its local non-volatile memory 30. Similarly, the BLACK and RED channel processors 58-1, 58-2, 36-1, 36-2 are waiting for the decrypted image of their respective portion of the software packages (or portion thereof) to begin flowing from the file system storage device 56. The portion of the software packages are portions thereof will generally include at least the operating environment for each processor, but can include additional computer code without limitation.

Red Core Processor Boot Process

Figure 5:
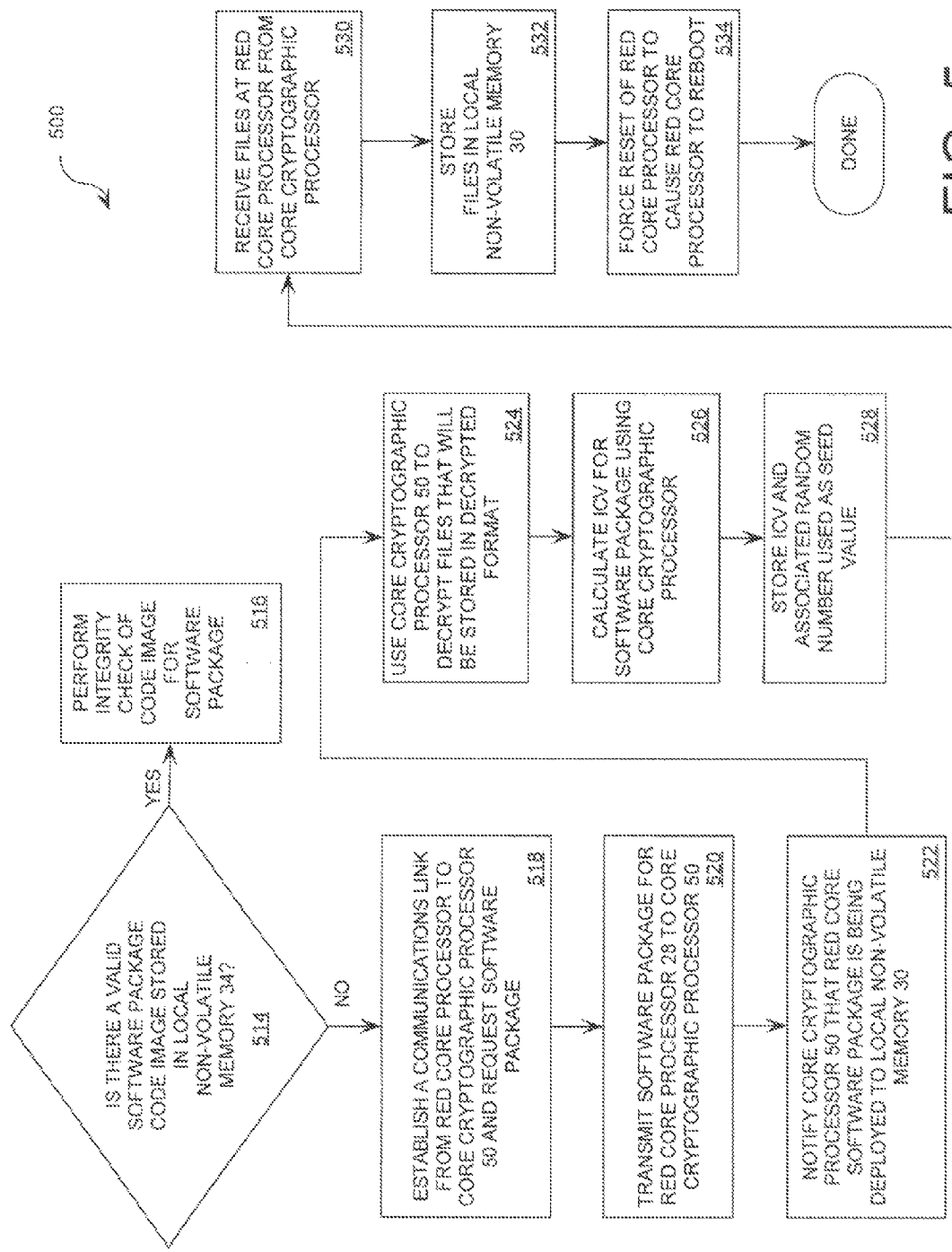
FIG. 5 is a flowchart of a portion of a boot software routine for the multi-channel software defined radio shown in FIG. 2

Referring now to FIG. 5, a boot process will be described for the RED core processor 28. The boot process for the RED core processor 28 can begin in step 514 by checking for the presence of a code image for the portion of its software package that should be stored in its local non-volatile memory 30. Accordingly, in step 514, the RED core processor 28 determines if there is a valid image of the portion of the software package for the RED core processor stored in a local non-volatile memory 30. At least during the first factory initialization of the SDR 200, no such valid code image will exist in the local non-volatile memory 30 (514:NO). Consequently, control passes to step 518. In step 518, a communications link is established between the RED core processor 28 and the core cryptographic processor 50. In step 520, the BLACK core processor 32 will retrieve from non-volatile file storage device 56 all encrypted files for the portion of the software package to be stored in the local non-volatile memory 30 of the RED core processor 28. The files comprising this portion of the software package will be communicated to the core cryptographic processor 50.

In step 522, the RED core processor 28 will notify the core cryptographic processor 50 that the operating system for RED core processor 28 is being deployed. This notification is necessary because the core cryptographic processor 50 will have to enable writing and storing the encrypted (if required) and decrypted portions of the software package into the local non-volatile memory 30. Such notification is also necessary because, the core cryptographic processor 50 will need to calculate an integrity check value (ICV) for the code image of the portion of the software package to be stored in the local non-volatile memory 30.

The portion of the software package for RED core processor 28 will generally include classified and non-classified files comprising at least the operating environment for the RED core processor. Non-classified software and data which are not of a sensitive nature are preferably stored without encryption in the local non-volatile memory 30. In contrast, classified or sensitive software or data may be required to be stored in local non-volatile memory 30 in an encrypted format. It is also feasible that classified code may be permitted to be stored unencrypted in local non-volatile memory 30. In either case, the core cryptographic processor 50 will eventually decrypt files as necessary for the RED core processor operating environment as shown in step 524.

It should be appreciated that the files to be installed and stored as encrypted or decrypted files may include a file label to identify them as such. File labels are well known to persons skilled in the art. Thus, file labels will not be described in detail herein. However, it should be appreciated that any type of file label known to persons skilled in the ad may be used without limitation.

In step 526 an integrity check value (ICV) is computed by the cryptographic processor 50 for the portion of the software package to be stored on local non-volatile memory 30. The precise method of calculating the integrity check value is not critical. However, the core cryptographic processor 50 will begin the process by generating a first random number of appropriate length. This first random number will be used by the cryptographic processor as a seed for calculating the first ICV. In step 528, the core cryptographic processor will save the first random number and the ICV together in secure memory 52. These values will be used during subsequent boot processes.

In step 530, the core cryptographic processor 50 will transmit the files comprising the portion of the software package to the RED core processor 28. In step 532, the RED core processor receives the files (decrypted except when they must be stored encrypted) and will store these files in the local non-volatile memory 30. Thereafter, in step 534, a reset command is communicated to the RED core processor 28 so as to cause it to reboot. This reset command can be provided by the core cryptographic processor 50, or can be provided by the RED core processor 28 itself. Because of the reboot, the RED core processor 28 will repeat the startup checks described in step 514 and will find that there is a valid image of a portion of the software package which is stored in the local non-volatile memory 30 (514:YES) (note that this will also typically be the case during a normal boot of the SDR 200). Accordingly, the process will continue on to step 516 where the RED core processor will perform an integrity check of the code image in local non-volatile memory 30. The integrity process associated with step 516 is described in greater detail in relation to FIG. 6.

Figure 6:
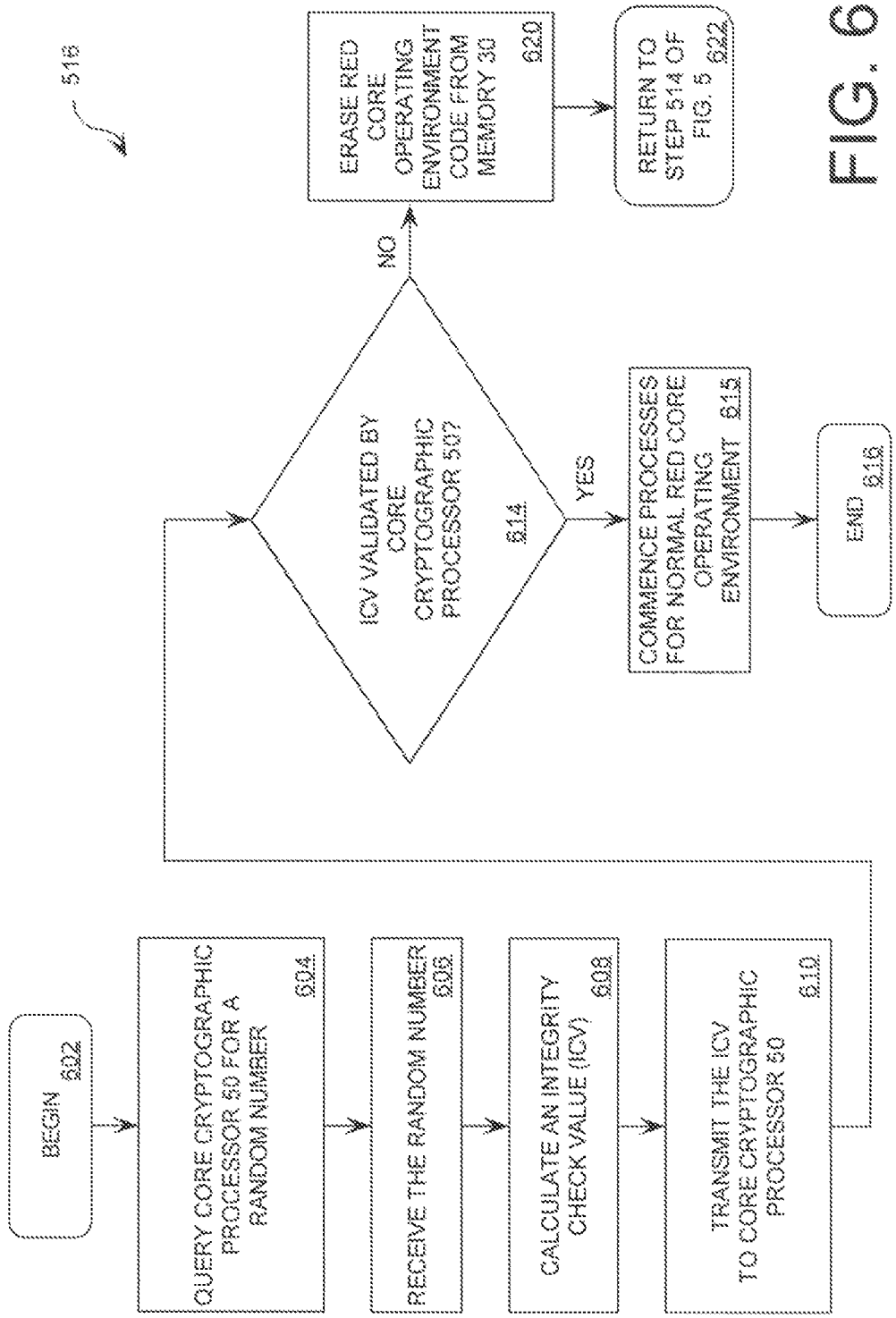
FIG. 6 is a flowchart of a portion of a boot software routine for the multi-channel software defined radio shown in FIG. 2

Referring now to FIG. 6, the process associated with step 516 begins with step 602 and continues to step 604. In step 604, the RED core processor 28 sends a message to the core cryptographic processor 50 requesting a random number. In step 606, the RED core processor 28 receives a random number from the core cryptographic processor 50. Upon receipt of the random number, the RED core processor 28 performs processing in step 608 to calculate an ICV for the code package stored in local non-volatile memory 30. It should be understood that the RED core processor 28 will utilize an algorithm to calculate an ICV and this will be the same algorithm which is used by the core cryptographic processor 50 in step 526. Accordingly, the RED core processor 28 should obtain an identical first ICV as obtained by the core cryptographic processor 50 in step 526.

In step 610, the RED core processor 28 transmits the ICV value it has calculated to the core cryptographic processor 50. Control then passes to a decision step 614. In step 614 the ICV value provided by the RED core processor will be compared to the ICV calculated by the core cryptographic processor 50 in step 526. If the values match, this is an indication that the portion of the software package contained in the local non-volatile memory 30 has not been altered. In the boot cycle for the RED core processor 28, only one ICV value will need to be verified because the RED core processor will normally be installed within a physical tamper protection boundary. Once the ICV is validated, the RED core processor commences normal operation and processing using the portion of the software package contained in local non-volatile memory 30.

If the ICV is not validated in step 614, then the portion of the software package comprising the RED core operating environment code is in step 620 erased from local non-volatile memory 30. Thereafter, the process returns to step 514 in FIG. 5.

Red Channel Process Boot Process

The boot process of the RED channel processors 36-1, 36-2 will be performed in a manner similar to that described above with respect to the RED core processor, with some minor differences. For example, the RED channel processors 36-1, 36-2 will interact with the channel cryptographic processors 54-1, 54-2 instead of the core cryptographic processor 50.

BLACK Channel Processor Boot Process

Figure 7:
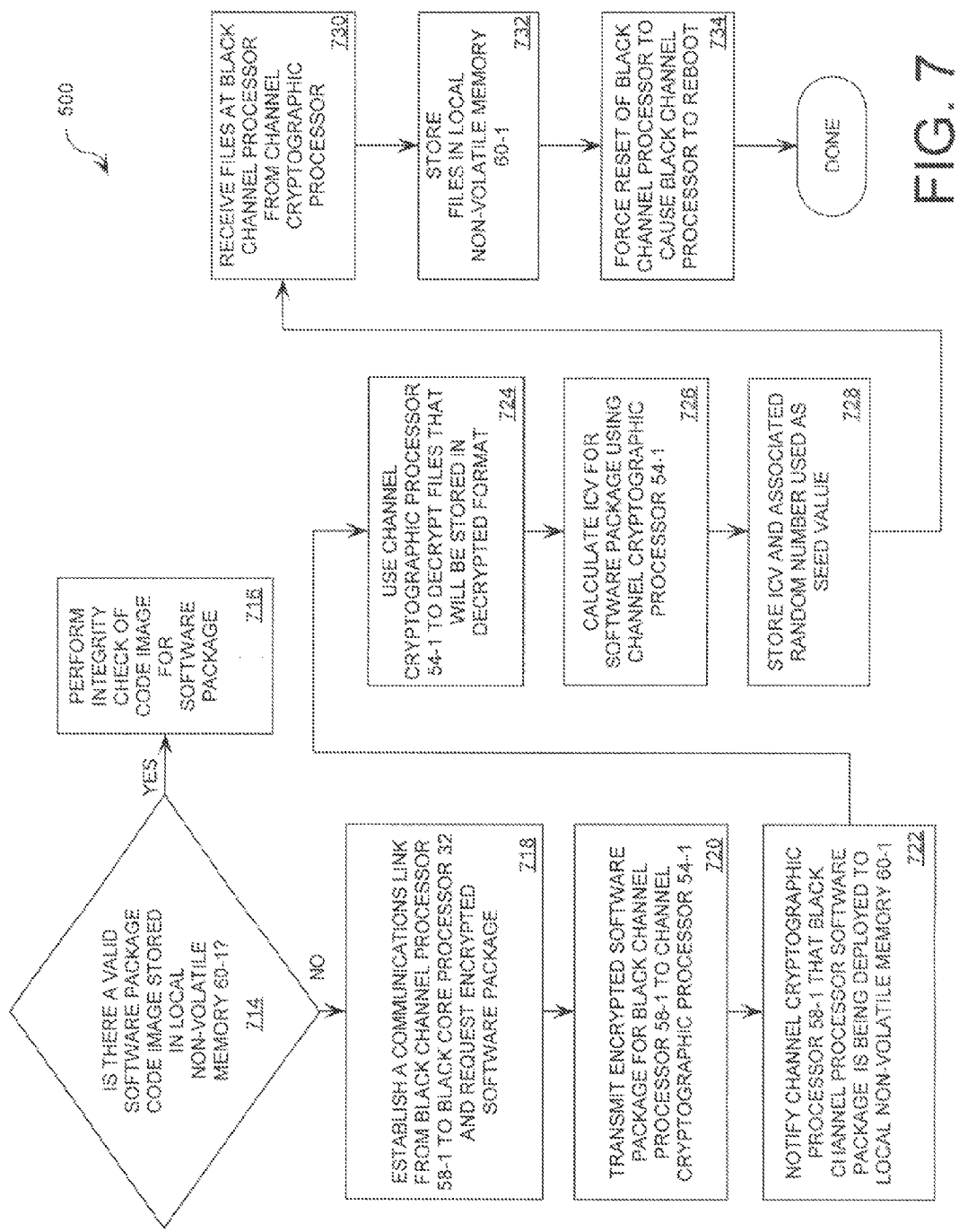
FIG. 7 is a flowchart of a portion of a boot software routine for the multi-channel software defined radio shown in FIG. 2

Referring now to FIG. 7, a boot process will be described for the BLACK channel processor 58-1. It should be understood that a similar process can be used for BLACK channel processor 58-2.

The boot process for the BLACK channel processor 58-1 can begin in step 714. In this step, the BLACK channel processor checks local non-volatile memory 60-1 for the presence of an image of the portion of the software package required by the BLACK channel processor 58-1. At least during the first factory initialization of the SDR 200, no such image will exist in the local non-volatile memory 60-1 (714: NO). Consequently, control passes to step 718. In step 718, a communications link is established between the BLACK channel processor 58-1 and the BLACK core processor 32 and a request is made for the encrypted portion of the software package needed for the BLACK channel processor 58-1. Generally, this will include at least the operating environment for the BLACK channel processor. If the boot process for the BLACK core process is not yet complete, the BLACK channel processor 58-1 will wait for the completion of such boot process. When the BLACK core processor 32 is fully operational the process will continue to step 720.

In step 720, the BLACK core processor 32 will retrieve from non-volatile file storage device 56 encrypted files comprising the portion of the software package required for the BLACK channel processor 58-1. The flies comprising this portion of the software package will be communicated through the BLACK switch fabric 66, to the BLACK channel processor 58-1 and ultimately to the channel cryptographic processor 54-1.

In step 722, the BLACK channel processor 58-1 will notify the channel cryptographic processor 54-1 that the operating system for BLACK channel processor 58-1 is being deployed. This notification is necessary because the channel cryptographic processor 54-1 will have to enable writing and storing the encrypted and decrypted portions of the portion of the software package to he stored in the local non-volatile memory 60-1. Such notification is also necessary because, the channel cryptographic processor 54-1 will need to calculate an integrity check value (ICV) for the image of the portion of the software package to be stored in the local non-volatile memory.

The portion of the software package to be stored in the local non-volatile memory 60-1 will generally include classified and non-classified flies. Non-classified software and data which are not of a sensitive nature are preferably stored without encryption in the local non-volatile memory 60-1. In contrast, classified or sensitive software or data are stored in local non-volatile memory 60-1 in an encrypted format Accordingly, in step 724, the channel cryptographic processor 54-1 will decrypt files as necessary for the BLACK channel processor operating environment.

In step 726 an integrity check value (ICV) is computed by the channel cryptographic processor 54-1 for the portion of the software package to be stored in local non-volatile memory 60-1. The precise method of calculating the integrity check value is not critical. However, the channel cryptographic processor 54-1 will begin the process by generating a first random number of appropriate length. This first random number will be used by the cryptographic processor as a seed for calculating the first ICV. In step 728, the channel cryptographic processor 54-1 will save the first random number and the ICV together in secure memory 72. These values will be used during subsequent boot processes.

In step 730, the channel cryptographic processor 54-1 will transmit the files in decrypted form (except when they must be stored encrypted) to the BLACK channel processor 58-1. These files comprising the portion of the software package to be stored in the local non-volatile memory 60-1 will be received by the BLACK channel processor. In step 732, the BLACK channel processor will store these files in the local non-volatile memory 60-1. Thereafter, in step 734, a reset command is communicated to the BLACK channel processor 58-1 so as to cause it to reboot. This reset command can be provided by the channel cryptographic processor 54-1, or can be provided by the BLACK channel processor 58-1 itself. Because of the reboot, the BLACK channel processor will repeat the startup checks described in step 714 and will find that there is an Image of the required portion of the software package stored in the local non-volatile memory 60-1 (714: YES) (note that this portion of the software package will also be present during a normal boot of the SDR 200). Accordingly, the process will continue on to step 716 where the BLACK channel processor will perform an integrity check of the portion of the software package in local non-volatile memory 60-1. The integrity process associated with step 716 is described in greater detail in relation to FIG. 8.

Referring now to FIG. 8, process 716 begins with step 802 and continues to step 804. In step 804, the BLACK channel processor 58-1 sends a message to the channel cryptographic processor 54-1 requesting a random number. In step 806, the BLACK channel processor 58-1 receives a random number from the channel cryptographic processor 54-1. The random number received can be, but is not necessarily, equal to the value of the first random number value as used by the channel cryptographic processor in step 726. Upon receipt of the random number, the BLACK channel processor 58-1 performs processing in step 808 to calculate an ICV for the code package stored in local non-volatile memory 60-1. It should be understood that the BLACK channel processor 58-1 will utilize an algorithm to calculate an ICV and this will be the same algorithm which is used by the channel cryptographic processor 54-1 in step 726. Accordingly, if the random number provided by the channel cryptographic processor 54-1 is in fact equal to the first random number, then the BLACK channel processor 58-1 should obtain an identical first ICV as previously obtained by the channel cryptographic processor in step 726.

In step 810, the BLACK channel processor 58-1 transmits the ICV value it has calculated to the channel cryptographic processor 54-1. The channel cryptographic processor 54-1 stores this value in secure memory 52. After step 811, control passes to a decision step 812. If a defined number of ICVs (for example, three (3) ICVs) have not been calculated (812:NO), the process returns to step 804 and the process in steps 804 though 811 are repeated. Each time steps 804 through 811 are repeated, a different random number is provided to the BLACK channel processor 58-1. Significantly, in one instance when the channel cryptographic processor 54-1 provides a random number to the BLACK channel processor 58-1, the value of the random number will be equal to the first random number originally used by the channel cryptographic processor 54-1 in step 726. Accordingly, only one ICV calculated by the BLACK channel processor 58-1 will equal the ICV calculated in step 726 (assuming that the portion of the software package in local non-volatile memory 60-1 has not been changed).

After a sufficient number of ICV values have been calculated (812:YES) the process will transition to step 814. In step 814 the first ICV value stored in secure memory 52 will be compared to the ICVs calculated by the BLACK channel processor. If the first ICV equals the ICV calculated by the BLACK channel processor using the first random number, then this fact is used by the cryptographic processor 54-1 as an indication that the portion of the software package contained in the local non-volatile memory 60-1 has not been altered. In the first boot cycle, only one ICV value will be verified.

The first random number value and the ICV calculated from the first random number value are always retained in secure memory 52. In addition, one of the other ICV values calculated in step 808, and the associated random number or seed value is also maintained in the secure memory 52. The remaining ICV values and random numbers can be discarded. Consequently, the channel cryptographic processor 54-1 will always store two sets of ICV/random number values for a portion of the software package stored in the local non-volatile memory 60-1. The first set will include the first ICV and first random number. The second set will include a second ICV based on a second random number from the previous boot cycle of the BLACK channel processor 58-1. In subsequent boot processes, the channel cryptographic processor 54-1 will provide the first random number and the second random number to the BLACK channel processor in separate iterations of step 806.

In step 814, the channel cryptographic processor 54-1 will verify that both the first and second random number values will cause the BLACK channel processor 58-1 to generate the correct corresponding ICV. Each time the BLACK channel processor is rebooted, the second random number and second ICV will be replaced with new values. However, the first random number and first ICV is always used as a check value. This dual ICV check significantly enhances the integrity assurance process.

If the ICV calculated in step 808 is determined to be incorrect in step 814 (814:NO), then control passes to step 820. In step 820, the existing portion of the software package stored in the local non-volatile memory 60-1 is erased. Subsequently, step 822 is performed where software routine 800 returns to step 714 of FIG. 7 such that another boot cycle of the BLACK channel processor is performed.

If the ICV has been validated by the channel cryptographic processor 54-1 (814:YES), then the process continues on to step 815 in which normal BLACK channel operating environment processing is commenced. This will generally involve setting up all of the processes necessary for normal operation of the BLACK channel processor 58-1. Thereafter, the boot process continues on to step 816 where the software routine 716 terminates.

The boot process for the BLACK channel processor 58-2 can proceed similarly to the process described in FIGS. 7 and 8 for the BLACK channel processor 58-1. Provided, however, that the BLACK channel processor 58-1 will Interact instead with local non-volatile memory 60-2 and channel cryptographic processor 54-2.

Post Initial Deployment Processing

In a subsequent boots of the SDR 200 occurring after the initial boot process as described in FIGS. 3-8, each processor 32, 28, 58-1, 53-2, 36-1, 36-2 would already have at least a portion of a respective software package installed in its respective local non-volatile memory 34, 30, 60-1, 60-2, 36-1, 36-2. Generally, such portion of the software package will comprise at least an operating environment for the particular processor, although the invention is not limited in this regard. Accordingly, in each subsequent boot process, each processor would determine the presence of its respective portion of the software package in the local non-volatile memory 34, 30, 60-1, 60-2, 36-1, 36-2, and perform its ICV calculations to verify the integrity of such software. The processors could perform these operations in parallel with each other so that each processor can proceed with its boot process concurrently. This is a significant improvement over the highly serialized nature of the conventional boot process.

As noted above, the portion of the software package stored in each local non-volatile memory 34, 30, 60-1, 60-2, 38-1, 38-2 will generally include at least the operating environment for the processor. At any point after the operating environment has been instantiated, then it will be possible to install and instantiate computer code for certain waveforms needed by the individual channel processors 58-1, 58-2, 38-1, 36-2. The process for providing such computer code to the various channel processors is similar to the process used to Install the operating environment for each processor.

For convenience, the process will be described with respect to the BLACK channel processors 58-1, 58-2. However, it should be understood that the waveform codes can be loaded in a similar way.

Referring to FIG. 2, each BLACK channel processor 58-1, 58-2 can communicate to its associated channel cryptographic processor 54-1, 54-2 that computer code associated with a waveform is going to be installed. The respective channel cryptographic processor can then enable writing to the appropriate local non-volatile memory 60-1, 60-2 for that processor. The necessary files would then he obtained by the BLACK core processor 32 from the non-volatile file storage device 56, and provided to the appropriate BLACK channel processor 58-1 or 58-2. The BLACK channel processor would communicate such files to the channel cryptographic processor 54-1, 54-2 for decryption, it will he appreciated that even though such computer code will be stored in an encrypted form in local non-volatile memory 60-1, 60-2 it is still necessary to provide such files to the channel cryptographic processor so that it can calculate an ICV value.

Notably, a separate ICV calculation can be performed for the computer code for generating certain waveforms and for the operating environment. This is necessary because calculating a single ICV value for the operating environment and the waveforms would result in a change in the ICV value each time new waveforms are installed. Consequently, the operating environment would need to be reinstalled each time new waveforms are installed. Accordingly, it is preferred that the ICV values for the waveform code be calculated separately from the operating environment, in an alternative embodiment of the invention, separate local non-volatile memory could be used for the operating environment and the waveform codes. In this way, an old waveform code could be cleared from memory without accessing the memory used to store the operating environment.

After the waveform code image has been stored in a local non-volatile memory of a channel processor 58-1, 58-2, write capability for the local non-volatile memory is disabled. Subsequently, the channel processor is rebooted to cause the respective channel processor to perform an ICV calculation for the waveform code. The waveform code can be validated in a manner similar to that previously described in relation to FIGS. 3-8. Thereafter, the channel processor can continue with the instantaition of the operating environment and the waveform code. It will be appreciated that some sensitive files will always be stored in encrypted form in the local non-volatile memory 60-1, 60-2, 36-1, 36-2. Accordingly, after the operating environment and waveform code has been integrity checked (by validating its ICV), such files will need to be decrypted each time the SDR 200 is booted.

The inventive process described herein will not speed up the initial installation of the operating environment or the waveforms needed for SDR 200. However, once the waveforms and operating environment are installed, then the process described herein will allow for a much more rapid reboot.

A person skilled in the art will further appreciate that the present invention may be embodied as a data processing system or a computer program product. Accordingly, the present invention may take the form of an entirely hardware embodiment, an entirely software embodiment or an embodiment combining software and hardware aspects. The present invention may also take the form of a computer program product on a computer-usable storage medium having computer-usable program code embodied in the medium. Any suitable computer useable medium may be used, such as RAM, a disk driver, CD-ROM, hard disk, a magnetic storage device, and/or any other form of program bulk storage.

Computer program code for carrying out the present invention may be written in Java®, C++, or any other object orientated programming language. However, the computer programming code may also be written in conventional procedural programming languages, such as "C" programming language. The computer programming code may be written in a visually oriented programming language, such as Visual Basic.

It should be further appreciated that computer program code for carrying out the method may be executed entirely on a SDR computer processing device, partly on a SDR computer processing device, entirely on a remote computer processing device, or partly on a remote computer processing device. If the computer program code is executed entirely on a remote computer processing device, the remote computer processing device may be connected to a SDR computer processing device through a local area network (LAN), a wide area network (WAN), or an Internet Service Provider.

All of the apparatus, methods and algorithms disclosed and claimed herein can be made and executed without undue experimentation in light of the present disclosure. While the invention has been described in terms of preferred embodiments, it will fee apparent to those of skill in the art that variations may be applied to the apparatus, methods and sequence of steps of the method without departing from the concept, spirit and scope of the invention. More specifically, it will be apparent that certain components may be added to combined with, or substituted for the components described herein while the same or similar results would be achieved. All such similar substitutes and modifications apparent to those skilled in the art are deemed to be within the spirit, scope and concept of the invention as defined.

I claim:

1. A method for booting a plurality of computer processors in a device designed for communicating sensitive information, comprising:
   loading from an external source exclusively into a first non-volatile memory of said device a computer software package that includes software required for booting each of said plurality of computer processors, said computer software package being stored in an encrypted form and said first non-volatile memory being external to said plurality of computer processors;
   copying from said first non-volatile memory to each of a plurality of second non-volatile memories, which are each provided exclusively for a respective one of said plurality of computer processors, an image comprising at least a portion of said computer software package that includes software required for only booting a respective computer processor of said plurality of computer processors;
   prior to processing said sensitive information with any of said plurality of computer processors, verifying an absence of any modification of said image for each said computer processor relative to an original authentic version of said image; and
   storing in a decrypted form said image for each of said plurality of computer processors in a respective one of a plurality of volatile memories internal to said plurality of computer processors if it is verified that said image is absent of any modification.

2. The method according to claim 1, wherein said verifying step comprises calculating a first integrity check value which is uniquely determined by a combination of said original authentic version of said image and a first random number.

3. The method according to claim 2, wherein said verifying step further comprises calculating said first integrity check value for each said image prior to copying each said image to a respective one of said plurality of second non-volatile memories.

4. The method according to claim 3, wherein said verifying step further comprises calculating said first integrity check value using at least one cryptographic processor separate from said plurality of computer processors.

5. The method according to claim 4, further comprising calculating with each of said plurality of computer processors at least one integrity check value for each said image stored in said second non-volatile memory each time said plurality of computer processors are booted.

6. The method according to claim 5, further comprising comparing said at least one integrity check value calculated by each said computer processor to at least said first integrity check value calculated by said at least one cryptographic processor.

7. The method according to claim 5, further comprising calculating with at least one of said computer processors a plurality of integrity check values each time said at least one computer processor is booted.

8. The method according to claim 7, further comprising storing in a memory device at least one of said plurality of integrity check values for performing an integrity check in a subsequent boot of said at least one computer processor.

9. The method according to claim 1, further comprising selecting said portion of said computer software package comprising a computer code to define an operating environment for said computer processors.

10. The method according to claim 1, further comprising selecting said portion of said computer software package comprising a computer code to define at least one waveform used by at least one of said computer processors.

11. The method according to claim 1, further comprising automatically erasing said image if any modification of said image is detected in said verifying step.

12. The method according to claim 11, further comprising automatically loading a new image in said second non-volatile memory subsequent to said erasing step, said new image exclusive of any modification relative to an original authentic version of said image.

13. The method according to claim 1, further comprising providing said image to a cryptographic processor, prior to said copying step for decryption and for calculation of an integrity check value which is uniquely determined by a combination of said original authentic version of said image and a first random number.

14. A fast booting software defined radio for communicating classified data, comprising:
   a plurality of computer processors each programmed with a boot software routine and comprising a volatile memory;
   at least one first non-volatile memory external to said plurality of computer processors;
   a plurality of second non-volatile memories respectively provided for each of said plurality of computer processors; and
   at least one electronic circuit configured to
      load from an external source exclusively into said first non-volatile memory a computer software package that includes software required for booting each of said plurality of computer processors, said computer software package being stored in an encrypted form,
      copy from said first non-volatile memory to each of said plurality of second non-volatile memories, which are each provided exclusively for a respective one of said plurality of computer processors, an image comprising at least a portion of said computer software package that includes software required for only booting a respective computer processor of said plurality of computer processors,
      verify an absence of any modification of said image for each of said plurality of computer processors relative to an original authentic version of each said image, and
      store in a decrypted form said image for each of said plurality of computer processors in a respective one of said volatile memories if it is verified that said image is absent of any modification.

15. The fast booting software defined radio according to claim 14, wherein said electronic circuit is further configured to calculate a first integrity check value for each said image which is uniquely determined by a combination of said original authentic version of said image and a first random number prior to copying each said image to a respective one of said plurality of second non-volatile memories.

16. The fast booting software defined radio according to claim 15, wherein each of said computer processors is programmed to calculate at least one integrity check value for each said image stored in said second non-volatile memory each time said computer processors are booted.

17. The fast booting software defined radio according to claim 16, wherein said electronic circuit is programmed to compare said at least one integrity check value calculated by each said computer processor to at least said first integrity check value calculated by said electronic circuit.

18. The fast booting software defined radio according to claim 14, wherein said electronic circuit is further configured to decrypt at least a portion of said image prior to said copying, and to calculate an integrity check value which is uniquely determined by a combination of said original authentic version of said image and a first random number.

19. The fast booting software defined radio according to claim 14, wherein said electronic circuit is further configured to automatically cause an erasure of said image if any modification of said image is detected.

20. The fast booting software defined radio according to claim 19, wherein said electronic circuit is configured to automatically enable loading of a new image in said second non-volatile memory subsequent to said erasing an image that has been determined to be modified, said new image exclusive of any modification relative to an original authentic version of said image.

* * * * *

UNITED STATES PATENT AND TRADEMARK OFFICE
CERTIFICATE OF CORRECTION

| | | |
|---|---|---|
| PATENT NO. | : 8,615,665 B2 | Page 1 of 1 |
| APPLICATION NO. | : 11/627410 | |
| DATED | : December 24, 2013 | |
| INVENTOR(S) | : John J. Fitton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1942 days.

Signed and Sealed this
Eleventh Day of August, 2015

Michelle K. Lee
*Director of the United States Patent and Trademark Office*